Patented Feb. 16, 1954

2,669,585

UNITED STATES PATENT OFFICE 2,669,585

MANUFACTURE OF CHLORAL

Lloyd R. Coster, Pine Bluff, Ark., assignor to Food Machinery & Chemical Corporation, San Jose, Calif.

No Drawing. Application May 6, 1949, Serial No. 91,877

1 Claim. (Cl. 260—601)

The present invention relates to the manufacture of chloral hydrate, $CCl_3CH(OH)_2$, and chloral, $CCl_3CHO$, and comprises an improved process for the manufacture of these products by the chlorination of ethyl alcohol.

As a consequence of my invention, these products are produced with high efficiency and in yields above 70% based on the ethyl alcohol which is chlorinated.

In accordance with my invention, ethyl alcohol associated with only a minor molal content of water, i. e. 95% ethyl alcohol or as substantially anhydrous alcohol, is chlorinated in a plurality of steps accompanied by the addition of water between successive chlorination steps as will be hereinafter more fully explained.

In carrying out my invention, ethyl alcohol containing only an insignificant amount of water is chlorinated in a batch in successive stages accompanied by a progressively increasing reaction temperature which is limited to a final temperature at least about 5 to 15° C. below the refluxing temperature of the reaction mixture.

For example, ethyl alcohol (ethanol), which for the purpose of this illustration will be assumed to be substantially anhydrous, is chlorinated by conducting chlorine gas therethrough.

*Stage 1.*—Two moles of ethanol react with four moles of chlorine to produce one mole of chloral alcoholate. This initial chlorination step may be continued for a sufficiently prolonged time, for example 80 hours, to produce a product of stated specific gravity (about 1.45 to 1.475).

The successive reactions during this stage may be expressed by the following formulae:

(a) $C_2H_5OH + Cl_2 \rightarrow C_2H_5OCl + HCl$
(b) $C_2H_5OCl + C_2H_5OH \rightarrow CH_3CH(OH)_2C_2H_5 + HCl$
(c) $CH_3CH(OH)OC_2H_5 + 3Cl_2 \rightarrow$
$CCl_3CH(OH)OC_2H_5 + 3HCl$

*Stage 2.*—When this constant specific gravity is attained, sufficient water is added to convert the resulting chloral alcoholate to chloral hydrate and alcohol. The reaction may be expressed as follows:

(d) $CCl_3CH(OH)OC_2H_5 + H_2O \rightarrow$
$CCl_3CH(OH)_2 + C_2H_5OH$

*Stage 3.*—The alcohol released by this addition of water next is chlorinated during a second stage of operation, thereby obtaining an additional half mole of chloral alcoholate.

*Stage 4.*—To the product, one-half mole of water may be added resulting in a further release of alcohol in accordance with reaction (d).

*Stage 5.*—The alcohol thus released may be chlorinated by a third stage of chlorination followed by the addition of one-fourth mole of water, a fourth stage of chlorination, addition of one-eighth mole of water, etc.

However, it is more practical and convenient to restrict the reaction instead of proceeding with successively decreasing additions of water, followed by successively shorter periods of chlorination.

For example, the additions of water may be restricted to two in all. One may proceed by chlorinating the original starting composition until a product is obtained of essentially a stated specific gravity of about 1.44 to 1.475. During this period, which may require ninety hours, two moles of chlorine react with each mole of original alcohol.

Next is added one-half mole of water for each original mole of alcohol. Thereupon, chlorination is continued. During the second period of chlorination, which may be continued for twenty hours, two moles of chlorine react with each mole of alcohol released by the first addition of water. Thereafter, the remaining water is added to effect reaction (d) above. In practical operation the water may be introduced by controlled injection during the overall period of chlorination but preferably after the first stage of chlorination.

The overall reaction may be expressed as follows:

$2C_2H_5OH + 8Cl_2 + 2H_2O \rightarrow 2CCl_3CH(OH)_2 + 10HCl$

Although not expressed by this formula, some of the chloral hydrate $CCl_3CH(OH)_2$ is converted by loss of water to chloral $CCl_3CHO$.

In some cases, the addition of water within the scope of my invention can be restricted to a single quantity added to the first chlorination product followed by a second chlorination.

An illustrative example of my invention, which should not be understood as being stated in limitation thereof, is the following:

Thirty-four moles of ethyl alcohol (essentially anhydrous) are placed in a reaction vessel surmounted by a water-cooled reflux condenser. Chlorine is introduced into the ethyl alcohol until a stated specific gravity of 1.44–1.475 is attained, at which time 17 moles of water should be added and the chlorination continued for five hours when a specific gravity of 1.54 to 1.575 is attained. An additional 17 moles of water are added at this time, and chlorination continued at a temperature of 85 to 90° C. until a specific gravity of 1.620 to 1.635 is attained. The amount of chlorine employed for the reaction totaled slightly in excess of four moles per mole of starting ethyl alcohol. The molar quantity of water added is equivalent to the molar quantity of starting ethyl alcohol. The reaction temperature, from beginning to end, covered a wide range but may be increased gradually at a substantially uniform rate and finished between about 85 and 90° C.

The reaction product consisted of 4000 grams of chloral and chloral-hydrate. Based on the theoretical yield of chloral-hydrate, the per cent yield is 71.4 and, based on the theoretical yield of chloral, the yield is 80% calculated on the amount of ethyl alcohol used. The product is suitable for use directly in the manufacture of the insecticide, DDT.

To 1,000 gallons of 95% alcohol in an acid-proof, brick-lined steel chlorinator, gaseous chlorine was introduced rapidly through a diffuser at a rate of about 250 lbs. per hour. The chlorinator temperature was controlled through an internal cooling coil and after the first initial jump in temperature the rise in temperature thereafter was in approximately a straight line curve to the end temperature which was maintained at 80° C.

Agitation of the batch charge within the chlorinator was effected merely by the lifting action of the chlorine gas. When the specific gravity of the mix within the chlorinator reached approximately 1.475, chlorination was discontinued whereupon 1200 lbs. of water was added directly to the chlorinator and chlorination continued for an additional period of time. The addition of water initiates the hydrolytic reaction set forth in Equation (d) above. However, this reaction is a reversible one and will proceed toward the right after equilibrium has been reached only by the removal of one of the products of the hydrolysis. This the second stage chlorination does. Therefore, during the second stage chlorination additional chloral-alcoholate is produced in accordance with the chemical reactions represented by formulas a, b, and c above. This particular phase is completed in this second stage when a specific gravity of 1.54 to 1.575 is obtained in the mix after several hours chlorination.

An additional amount of water, namely 600 lbs. was then added to the chlorinator and chlorination again resumed in a third stage until a specific gravity in the mix of 1.625 was obtained.

The chlorinated product was then withdrawn, permitted to stand and crystallize as chloral-hydrate when cooled to room temperature. The crystals were about 84% chloral-hydrate, 8% water, 3.4% hydrogen-chloride, 1.2% acetic acid and traces of unidentified materials. The product could be used directly for condensation with chlorobenzene to produce a DDT of a very high setting point, namely 92° C.

As no chlorination catalyst is required when chlorinating alcohol within the range 95% to absolute, and in accordance with the present invention the product need not be purified by distillation but may be used directly for condensation with monochlorobenzene. The operation of this invention is a batch operation in which gaseous products of the reaction such as HCl are continuously withdrawn as produced and in which a minimum of unwanted by-products are produced.

Although theoretically a considerable number of stages of water addition may be used, it has been found preferable in commercial practice to chlorinate in three steps or stages adding after the first chlorination stage about one-half mole of water per mole of the initial alcohol and then chlorinate to a gravity of about 1.575 then add one-quarter mole of water per mole of initial alcohol and discontinue the chlorination when a gravity of 1.625 is obtained.

It will be understood that a variation on this operation is to chlorinate alcohol of a concentration of 95% to absolute to a gravity of about 1.475 to 1.5, and then continuously add water and chlorine in an amount not over 1.5 mole of water per mole of initial alcohol and preferably one mole of water per mole of alcohol, and continue the chlorination until a gravity of 1.625 to 1.635 is obtained.

Pressure appears to have little effect on the yield obtainable by the new procedure. The ratio of chlorine introduced to ethyl alcohol may be varied between about 3.5 and about 4.5 moles per mole of alcohol. The optimum ratio of water, which is introduced into the reaction after chlorination has begun, is between about 0.5 mole and about 1.5 moles per mole of starting alcohol. The time is considered to be a function of the rate of introduction of the chlorine and of the temperature. Higher temperature for the reaction decreases somewhat the time required, but the temperature should always be maintained at least about 5° below the current refluxing temperature of the reaction mixture to depress the tendency of the reaction to produce ethyl chloride.

Various modifications may be made in the invention without departing from the spirit or scope thereof, and it is to be understood that I limit myself only as defined in the appended claim.

This is a continuation-in-part of Serial No. 25,520, filed May 6, 1948, now abandoned.

What is claimed is:

The batch method of preparing chloral-hydrate of a purity such that it may be used directly in the manufacture of DDT which comprises adding chlorine gas in the absence of a chlorination catalyst to a starting composition consisting solely of ethyl alcohol in the range 95% to absolute alcohol until the specific gravity of the batch is at least 1.44, thereafter adding about 0.50 mole of water per mole of starting ethanol and chlorinating at a temperature higher than that in the first stage until a specific gravity of 1.54 in the batch is reached, then adding about 0.25 mole of water per mole of starting ethanol and chlorinating at a temperature higher than in the second stage and completing the chlorination when the specific gravity of the batch is 1.620 to 1.635 and the temperature 85° C. to 90° C. and withdrawing the chloral-hydrate so formed for use directly in the manufacture of DDT.

LLOYD R. COSTER.

References Cited in the file of this patent

UNITED STATES PATENTS

| Number | Name | Date |
| --- | --- | --- |
| 2,478,741 | Brothman | Aug. 9, 1949 |